United States Patent
Knerr

(10) Patent No.: US 6,874,380 B2
(45) Date of Patent: Apr. 5, 2005

(54) SLIDE ADJUSTMENT SYSTEM FOR BRAKE ROTOR TESTING GAUGES

(75) Inventor: Mark Daniel Knerr, St. Charles, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 246 days.

(21) Appl. No.: 10/369,153

(22) Filed: Feb. 18, 2003

(65) Prior Publication Data

US 2004/0159168 A1 Aug. 19, 2004

(51) Int. Cl.⁷ .............................................. G01M 19/00
(52) U.S. Cl. .................................................... 73/865.8
(58) Field of Search ........................... 73/865.8, 866.5, 73/462; 33/609, 203, 523, 533; 324/240, 242, 226

(56) References Cited

U.S. PATENT DOCUMENTS

| | | | |
|---|---|---|---|
| 5,469,629 A | 11/1995 | Rogler | |
| 5,850,046 A | * 12/1998 | Slates et al. | ............... 73/866.5 |
| 6,067,857 A | 5/2000 | Cooper et al. | |
| 6,233,533 B1 | 5/2001 | Xu et al. | |

FOREIGN PATENT DOCUMENTS

WO  9963353  12/1999

* cited by examiner

Primary Examiner—Robert Raevis
(74) Attorney, Agent, or Firm—Howard & Howard

(57) ABSTRACT

An improved testing system for a manufactured rotary metal product having upper and lower surfaces. The testing system includes a gage frame with a fixed lower portion and a vertically movable gaging probe carrier in alignment with the lower portion configured for vertical movement between open and closed configurations to permit the loading and unloading of a product in the testing system. A shaft is provided for supporting the manufactured rotary metal product rotationally about a fixed axis within the gage frame, and at least one set of detectors is provided on each of the upper and lower gage frame portions to produce signals representative of the presence of predetermined characteristics on the upper and lower surfaces of the manufactured rotary metal product as the product is rotated. A set of compound slides are secured to the gage frame and configured to support the detectors for two-dimensional positional adjustments relative to a upper and lower surfaces of the manufactured rotary metal product supported on the shaft and to the gage frame upon which the slides are secured, when in the closed configuration.

12 Claims, 5 Drawing Sheets

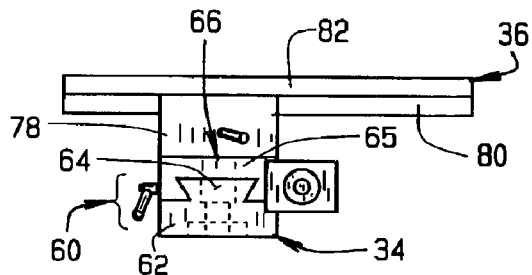
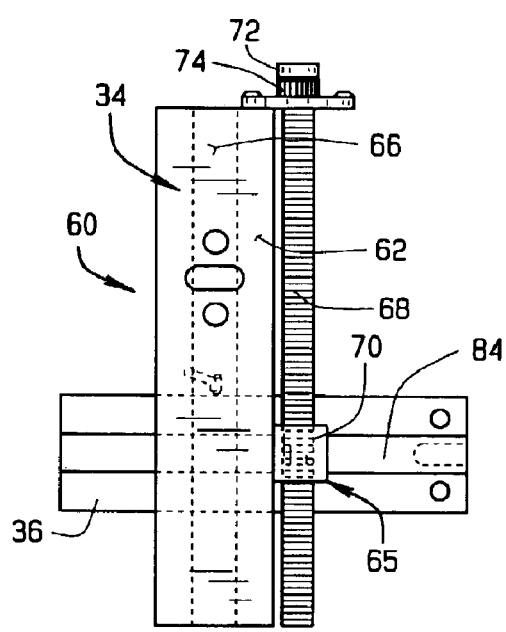
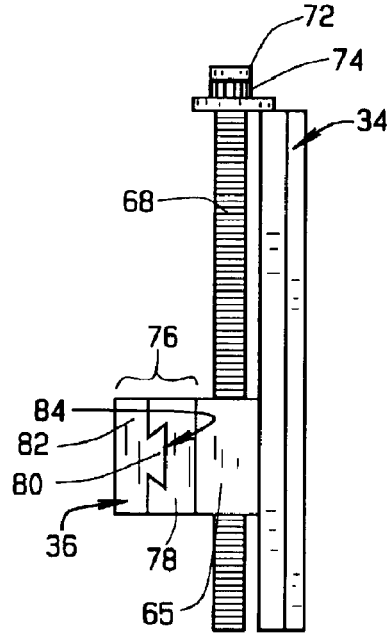
FIG. 3B
FIG. 3A
FIG. 3C

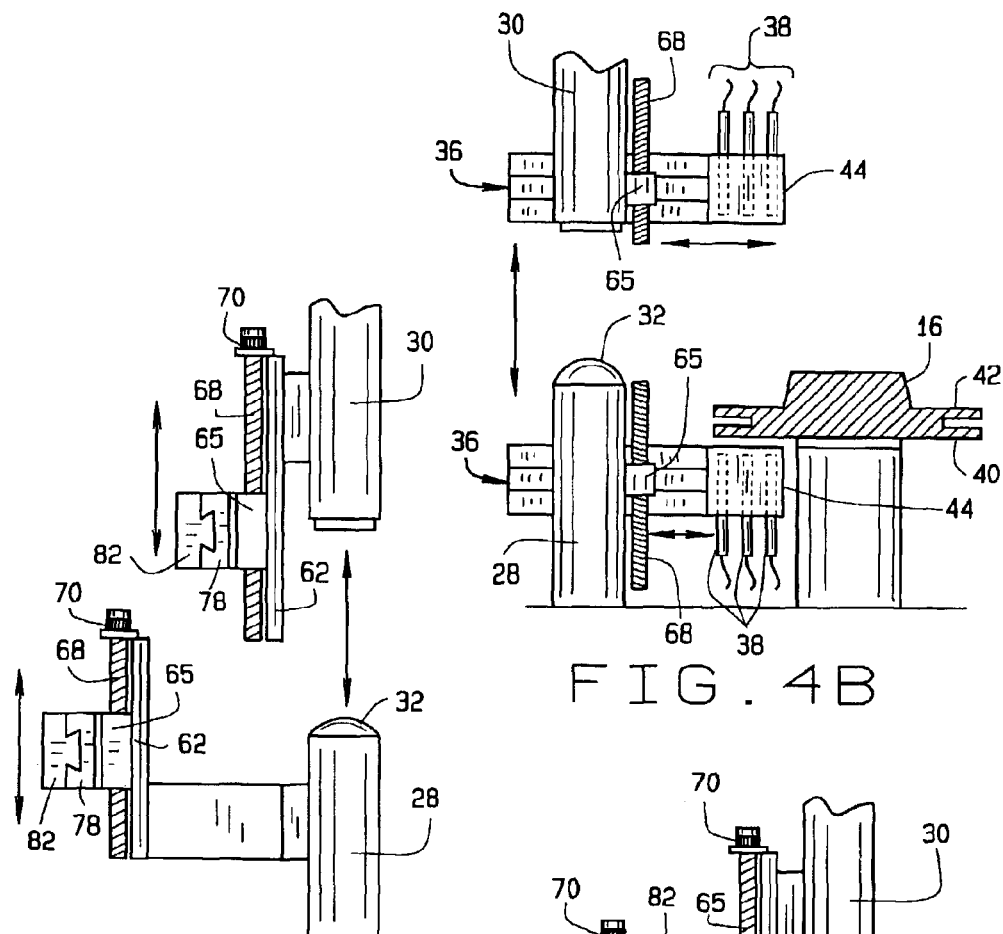
FIG. 4A
FIG. 4B
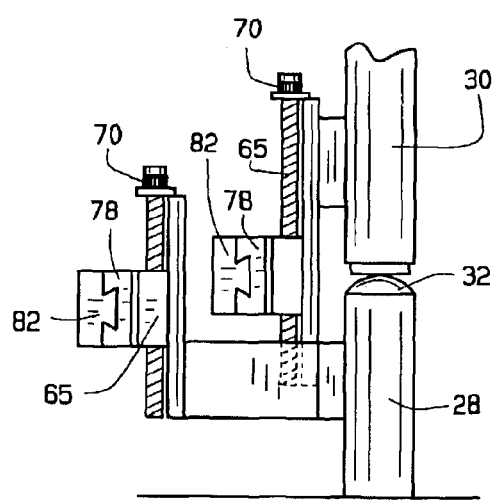
FIG. 5

SLIDE ADJUSTMENT SYSTEM FOR BRAKE ROTOR TESTING GAUGES

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention related generally to an inspection and testing system for manufactured rotary metal products such as automotive disc brake rotors, which are inspected from the standpoints of balance, dimensional gauging, and/or the detection of surface flaws, and specifically, to an improved mounting structure for the adjustable positioning a set of detectors in two-dimensional space adjacent the upper and lower surfaces of an automotive disk brake rotor undergoing testing.

The inspection of a machined rotary metal workpiece such as an automotive disc brake rotor commonly involves mounting the workpiece for rotational movement in an inspection and testing system having gaging probes or detectors secured adjacent the surfaces of the workpiece. Conventional testing systems employ a rotary shaft enclosed within a gage frame. The gage frame consists of a fixed lower portion into which the rotary shaft and associated drive components are mounted, and a movable upper portion or gaging probe carrier which is displaceable vertically to move the gaging probes or detectors out of the way to permit the placement of a workpiece undergoing testing on the rotary shaft.

Once a workpiece undergoing testing is secured to the rotary shaft, the upper portion of the gage frame or gaging probe carrier is lowered or closed to a predetermined position in which it engages a stop on the lower portion of the gage frame. The closing of the upper portion of the gage frame moves one or more of the gage probes or detectors mounted thereon into predetermined and fixed positions in proximity to the upper surfaces of the workpiece. Complimentary gage probes or detectors disposed in predetermined and fixed positions on the lower portion of the gage frame are held in proximity to the lower surfaces of the workpiece once the workpiece is secured on the rotary shaft.

During testing, as the workpiece is rotated about a central axis by the rotary shaft, the upper and lower surfaces are swept between the corresponding detectors mounted to the upper gaging probe carrier and lower gage frame portions, permitting measurements to be taken of various surface dimensions, characteristics, defects, and workpiece balance. An example of a conventional inspection and testing system for use with automotive disc brake rotors can be found in U.S. Pat. No. 6,067,857 to Cooper et al. and assigned to Balance technology, Inc. of Ann Arbor, Mich.

While such conventional inspection and testing systems permit the economically and rapid testing of large numbers of manufactured rotary metal products having uniform dimensions, such as from a factory assembly line, the fixed mounting of the detectors to the upper gage frame or gaging probe carrier and to the lower gage frame portions requires tedious and time-consuming changeover and setup for use with manufactured rotary metal products of different dimensions. Spacing and tolerance requirements to hold the detectors in predetermined positions relative to the surfaces undergoing inspection conventionally require that an operator remove and replace rigid detector mounting structures for each differently sized workpiece. For the testing of a small number of differently sized products such as automotive brake discs for different vehicles, the time required to change the inspection and testing system tooling to accommodate each size of product can exceed the time required to perform the actual surface testing.

Accordingly, there is a need in the industry for an improved testing and inspection system for manufactured rotary metal products which permits the placement of various surface detectors relative to a product undergoing testing to be altered and adjusted in two-dimensional space without the need to remove and replace components and/or tooling, thereby reducing the time required to alter the testing and inspection system to accommodate products of different dimensions.

BRIEF SUMMARY OF THE INVENTION

Briefly stated, the present invention provides an improved testing system for a manufactured rotary metal product having upper and lower surfaces. The testing system includes a gage frame with a fixed lower portion and a vertically movable upper portion or gaging probe carrier in alignment with the lower portion. The upper portion is configured for vertical movement between open and closed configurations to permit the loading and unloading of a product in the testing system. A shaft is provided for supporting the manufactured rotary metal product rotationally about a fixed axis within the gage frame, and at least one set of detectors is provided on each of the upper and lower gage frame portions to produce signals representative of the presence of predetermined characteristics on the upper and lower surfaces of the manufactured rotary metal product as the product is rotated. The improvement of the present inventions consists of a set of compound slides secured to the gage frame and configured to support the detectors for two-dimensional positional adjustments relative to a upper and lower surfaces of the manufactured rotary metal product supported on the shaft and to the gage frame upon which the brackets are secured.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3A is a front view of the two-dimensional adjustable components in a compound slide of the present invention;

FIG. 3B is a top view of the two-dimensional adjustable components of FIG. 3A;

FIG. 3C is a side view of the two-dimensional adjustable components of FIG. 3A;

FIG. 4A is a side view of the first and second compound slides of the present invention secured to the components of a gage frame in an open configuration, illustrating parallel vertical alignment thereof;

FIG. 4B is a front view of the first and second compound slides of FIG. 4A, illustrating vertical alignment of detectors secured thereto;

FIG. 5 is a side view similar to FIG. 4A, illustrating the gage frame in a closed configuration and the relative spacing of the first and second compound slides;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
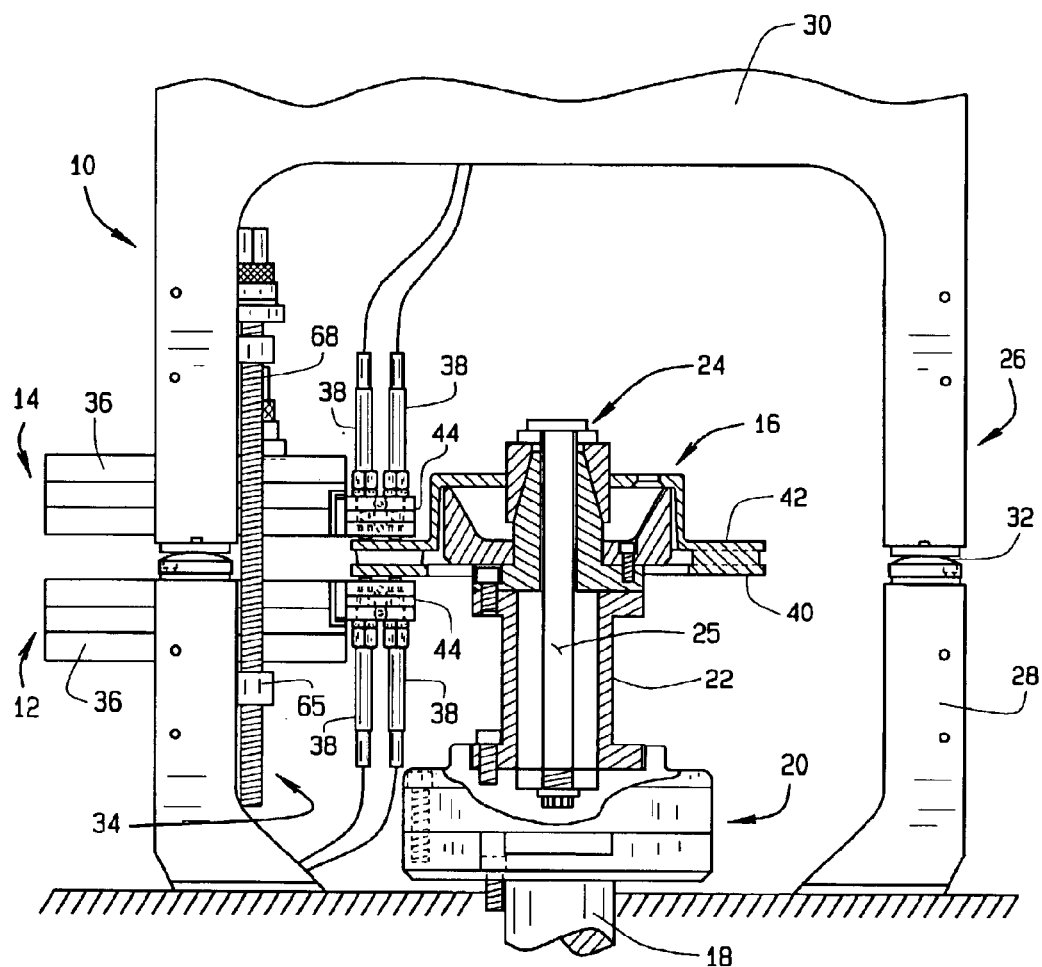
FIG. 1 is a front partial sectional view of the improved testing system of the present invention configured to test a first manufactured rotary metal product.

Turning to FIG. 1, a testing and inspection system 10 configured with an improved lower compound slide 12 and an improved upper compound slide 14 is shown in a front partial sectional view. The testing and inspection system 10 is in a closed configuration about a manufactured rotary metal product 16. In this illustration the product 16 is an automotive disc brake rotor having a first set of dimensions, which is axially secured to a rotary shaft 18. The rotary shaft 18 consists of a base 20 coupled to a drive mechanism (not shown) for rotational movement and a cylindrical spacer 22 configured to position the product 16 at a desired general inspection level. The product 16 is secured to the rotary shaft 18 by a conventional precision collet assembly 24 mounted on the cylindrical spacer 22 and configured to pass through an axial bore in the product 16. The precision collet assembly 24 engages the product 16 with a radial clamping force upon the manual or automatic tightening of an axial draw screw 25 to retain the product 16 on the rotary shaft 18.

The rotary shaft 18 is enclosed within a gage frame 26 consisting of a fixed lower portion 28 and a movable upper portion or gaging probe carrier 30 passing over the product 16. The gaging probe carrier 30 is vertically displaceable between an open configuration and a closed configuration, shown in FIG. 1, in which the gaging probe carrier 30 is in contact with the lower portion 28 of the gage frame 26 at a pair of closure stops 32.

As illustrated generally in FIG. 1, each compound slide 12 and 14 consists of a vertical adjustment arm 34 configured for vertical adjustment relative to the supporting gage frame components, and a horizontal adjustment arm 36 configured for horizontal adjustment relative to the associated vertical adjustment arm 34. Each compound slide 12 and 14 further supports one or more gage probes 38 in an associated gage probe block 44 coupled to the associated horizontal adjustment arm 36. The gage probes 38 are commercially available probes such as linear voltage differential transformer (LVDT) probes and associated signal processing circuits (not shown).

Prior to use of the testing and inspection system 10 with product 16, each of the vertical adjustment arms 34 and horizontal adjustment arms 36 is adjusted in two dimensions to position the gage probes 38 in operational proximity to a lower surface 40 and upper surface 42 of the product 16 when the gaging probe carrier 30 is in the closed configuration.

Figure 2:
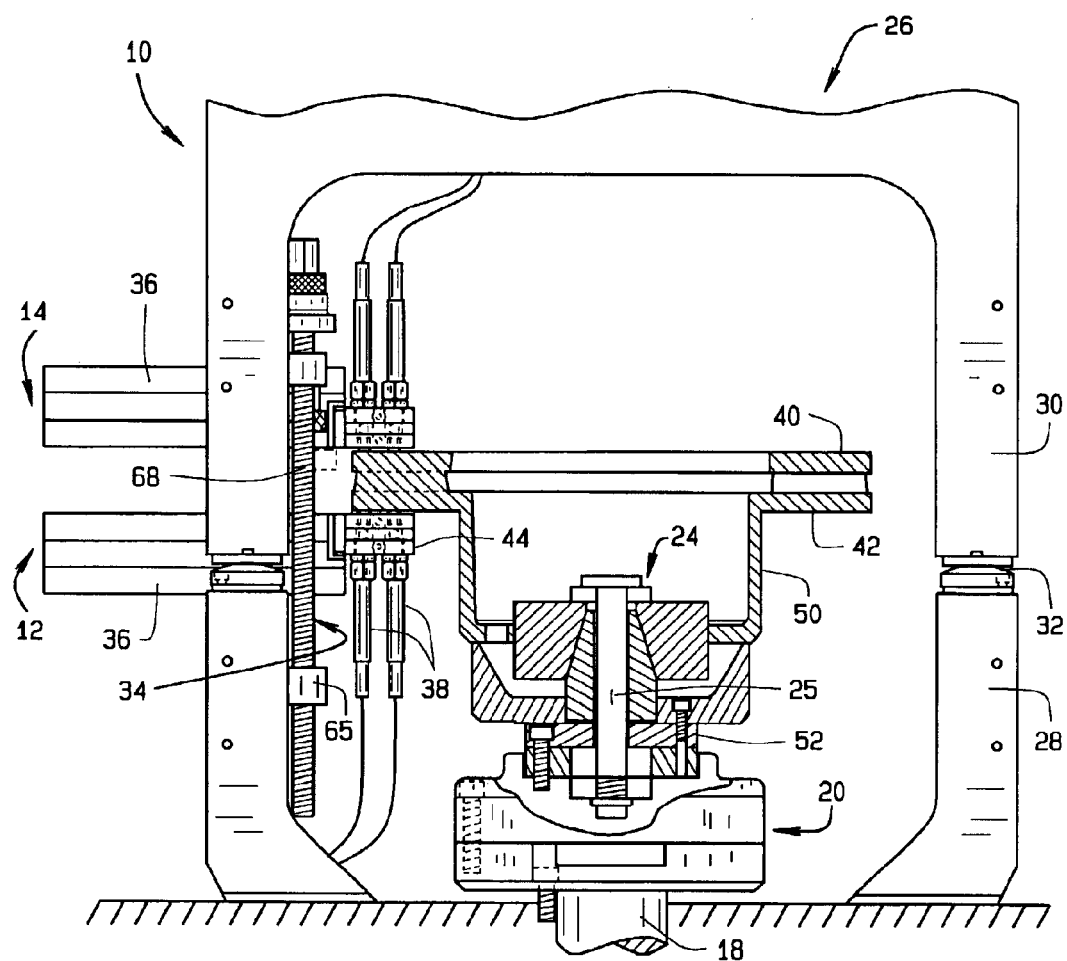
FIG. 2 is a front partial sectional view of the improved testing system of the present invention configured to test a second manufactured rotary metal product having different dimension from the first product in FIG. 1.

FIG. 2 illustrates generally an exemplary setup of the testing and inspection system 10 with a manufactured rotary metal product 50, such as an automotive disc brake rotor, having different dimensions than product 16 shown in FIG. 1. Product 50 is shown retained on the rotary shaft 18 in an inverted orientation by engagement with the precision collet assembly 24. The precision collet assembly 24 is, in turn, coupled to a cylindrical spacer 52 mounted to the base 20 of the rotary shaft 18. Those of ordinary skill in the art will recognize that the size of the cylindrical spacers 22 and 52 utilized with the testing and inspection system 10 are selected to position the manufactured rotary metal product undergoing inspection in a generally predetermined operating region within which the gage probes 38 may be precisely positioned by adjustment of the compound slides 12, 14.

Further illustrated in FIG. 2, the positions of each vertical adjustment arm 34 and each horizontal adjustment arm 36 in the improved first and second compound slides 12 and 14 have been adjusted from the positions shown in FIG. 1 to accommodate gage probes 38 in operational proximity to the respective surfaces of product 50 when the gaging probe carrier 30 is in the closed configuration.

Turning to FIG. 3A through FIG. 3C, the adjustable components of a compound slide 12 and 14 are shown. Each compound slide 12 and 14 utilizes the same components to provide the two-dimensional adjustment for the gage probes 38 in the gage probe blocks 44. These components are described below in the context of lower compound slide 12, and those of ordinary skill in the art will recognize that the same components are present in upper compound slide 14.

Lower compound slide 12 functions to provide adjustment to the position of the gage probes 38, secured in the gage probe block 44, in two dimensions, i.e. vertically and horizontally. Adjustments in the vertical dimension are utilized to position the gage probes 38 at a desired height in proximity to the surface of a manufactured rotary metal product undergoing testing and inspection. Correspondingly, adjustments in the horizontal dimension are utilized to position the gage probes 38 at a desired radial distance from the axis of rotation of the product mounted on the rotary shaft 18.

Each gage probe 38 is secured within a gage probe block 44 coupled to the horizontal adjustment arm 36 of the lower compound slide 12. The horizontal adjustment arm 36, together with the coupled gage components, is in turn, secured in a vertically adjustable manner to the vertical adjustment arm 34 of the lower compound slide 12. In the preferred embodiment of the present invention, the horizontal adjustment arm 36 is coupled to the vertical adjustment arm 34 using a vertical dove-tail slide assembly 60, as shown in FIG. 3B.

The vertical dove-tail slide assembly 60 comprises a fixed slide base 62 having a vertically aligned dove-tail 64. A slide block 65, onto which the horizontal adjustment arm 36 is secured, retains the dove-tail 64 in a vertically aligned matching dove-tail channel 66. The interaction of the dove-tail 64 and the dove-tail channel 66 permit movement of the slide block 65 only in the vertical direction. Movement of the slide block 65 is controlled by a vertically aligned threaded rod 68 secured for rotational movement to the slide base 62. The threaded rod 68 engages a threaded bore 70 on the slide block 65, such that rotation of the threaded rod 68 moves the slide block 65 by screw action vertically along the dove-tail 64. Preferably, the threaded rod 68 is provided with a knob 72 and one or more graduated marks 74, to facilitate identification of the rotary position of the threaded rod 68.

To provide for horizontal movement of the gage probes 38, the horizontal adjustment arm 36, as best seen in FIG. 3B and FIG. 3C, includes a horizontal dove-tail slide assembly 76. The horizontal dove-tail slide assembly 76 comprises a fixed slide base 78 coupled to the vertical dove-tail slide assembly 60. The slide base 78 includes a horizontally aligned dove-tail 80. A slide block 82, onto which the gage probe block 44 is secured, retains the dove-tail 80 in a horizontally aligned matching dove-tail channel 84. The interaction of the dove-tail 80 and the dove-tail channel 84 permits movement of the slide block 82 only in the horizontal direction. In the preferred embodiment, movement in the horizontal direction is controlled by one or more set screws (not shown) in the slide block 82, which may be tightened to prevent movement, or released to permit horizontal sliding the slide block 82 relative to the slide base 78.

Turning to FIGS. 4A and 4B, the relative movements of each of the compound slides 12, 14, and the gage frame 26 components are illustrated. In FIG. 4A, the compound slides 12 and 14 are shown from a side view, illustrating the vertical movement of each horizontal adjustment arm 36 along the associated vertical adjustment arms 34, as well as the vertical opening and closing movement of the gaging probe carrier 30. Horizontal movement of each gage probe block 44 on the horizontal adjustment arm 36 are illustrated in FIG. 4B, together with the vertical opening and closing movement of the gaging probe carrier 30. As can be clearly seen in FIGS. 4A and 4B, the compound slides 12 and 14 provide for two-dimensional adjustment of the gage probe blocks 44 relative to a manufactured rotary metal product undergoing testing, independent of the vertical movement of the gaging probe carrier 30 transitioning between an opened and closed configuration. The two-dimensional adjustment ranges of the gage probe block 44 positions permits the testing and inspection system 10 to be rapidly configured to place the gage probe blocks 44 in operative proximity to the surfaces of a manufactured rotary metal product upon moving the gaging probe carrier 30 to a closed configuration, without the need to remove or replace components supporting the gage probe blocks 44.

Figure 6:
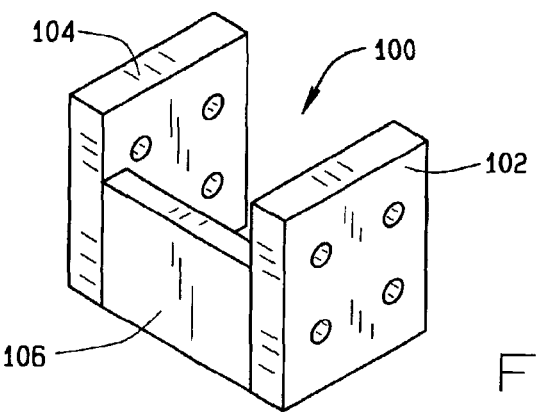
FIG. 6 is a perspective view of a spacing bracket of the present invention.

In the preferred embodiment of the present invention, the range of vertical movement for each of the compound slides 12 and 14 includes an overlapping region when the gaging probe carrier 30 is in a closed configuration. As best seen in FIG. 5, to accommodate the preferred range of vertical movement, compound slides 12 and 14 are offset from each other in a parallel vertically aligned configuration using a spacer bracket 100. As shown in FIG. 6, spacer bracket 100 provides a compound slide attachment plate 102 and a gage frame attachment plate 104, coupled by an offset spacer 106. The offset spacer 106 displaces the compound slide attachment plate 102 from the gage frame attachment plate 104. In the preferred embodiment shown in FIG. 5, the lower compound slide 12 is secured to the gage frame 26 with the spacer bracket 100, providing clearance for vertical movement of the components of the upper compound slide 12 when the gaging probe carrier 30 is in the closed configuration. Those of ordinary skill in the art will recognize that a variety of configurations for the spacer bracket 100 may be utilized, and that either the lower compound slide 12 or the upper compound slide 12 may be secured to the gage frame 26 using the spacer bracket 100, to provide sufficient clearance for vertical movement of the other compound slide.

Figure 7:
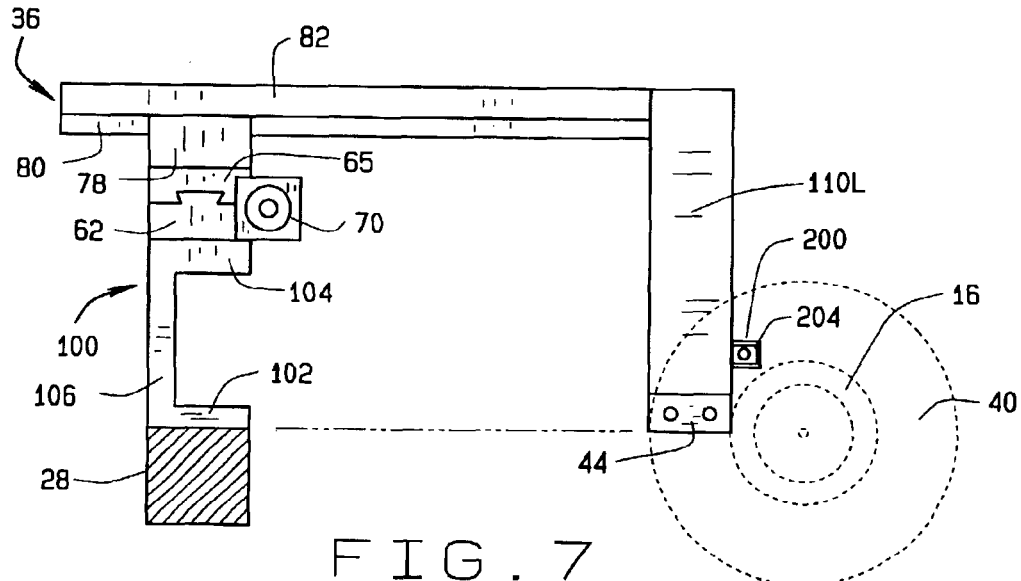
FIG. 7 is a top view of an lower support bracket, illustrating the relative position of the components and a manufacture rotary metal product shown in phantom.
Figure 8:
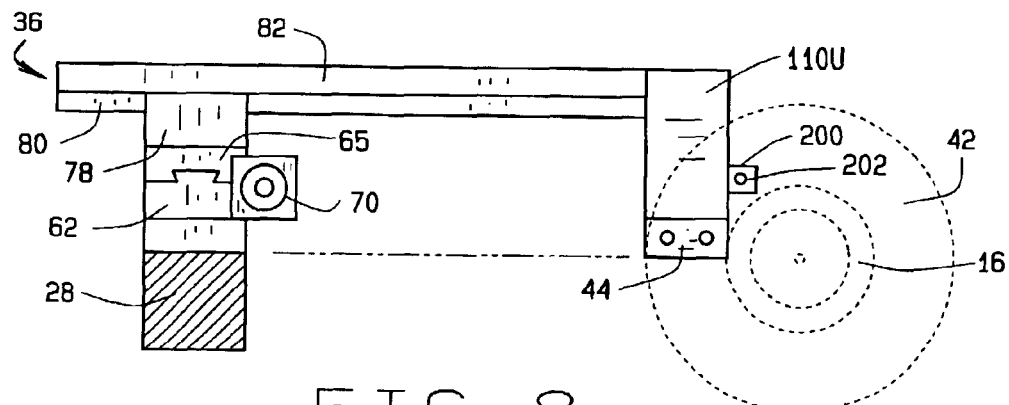
FIG. 8 is a top view of an upper support bracket, similar to FIG. 7.

Turning next to FIGS. 7 and 8, it can be seen that each gage probe block 44 is secured to an associated horizontal adjustment arm 36 by a gage probe arm 110L, 110U. The length of the gage probe arm 110L or 110U is selected such that each gage probe block 44 is in vertical alignment above and below the surfaces of a manufactured rotary metal product, shown in phantom. As is apparent from FIGS. 7 and 8, the gage probe arm 110L associated with the lower compound slide 12 and spacer 100 is of a greater length than the gage probe arm 110U, associated with the upper compound slide 14.

To facilitate the automatic detection of the presence or absence of a manufactured rotary metal product mounted to the rotary shaft 18 when the gaging probe carrier 30 is in the closed configuration, the present invention preferably includes a product detector 200 disposed on the gage probe arms 110L and 110U. The product detector 200 preferably consists of an optical transceiver 202 disposed on gage probe arm 110U and an optical reflector 204 disposed on gage probe arm 110L, in vertical alignment with the optical transceiver 202. Optionally, the optical reflector 204 may be replaced by an optical detector. The product detector 200 generates a signal responsive to the interruption of an optical beam emitted by the optical transceiver 202 and reflected back from the optical reflector 204 or received by an optical detector. Those of ordinary skill in the art will recognize that the product detector 200 may utilize wavelengths other than those in the optical spectrum to detect the presence or absence of a product disposed in a line of sight between an emitter and a reflector or receiver. Since the product detector 200 is disposed on the gage probe arms 110L and 110U, two-dimensional adjustments to the position of the gage probe blocks 44 will correspondingly adjust the position of the product detector 200, without requiring additional operator steps or setup.

Prior to operation on a first series of manufactured rotary metal products, the testing and inspection system 10 is placed in an open and unloaded configuration. Each improved compound slide 12 and 14 is adjusted by moving the vertical adjustment arm 34 and the horizontal adjustment arm 36 to predetermined positions in two-dimensional space which place the gage probe blocks 44, and associated gage probes 38, in operational proximity to the surfaces of a manufactured rotary metal product secured to the rotary shaft 18. These predetermined positions may be obtained from a table-lookup corresponding to the expected dimensions of the series of manufactured rotary products, or from prior experience. Next, a manufactured rotary metal product to undergo inspection and testing in secured to the rotary shaft 18, and the testing and inspection system 10 placed in a closed configuration by lowering the gaging probe carrier 30 into contact with the lower portion of the gage frame 28. Preferably, for at least the first product undergoing testing and inspection, an operator performs a visual check to ensure that the adjustments to the horizontal and vertical adjustment arms of the compound slides 12 and 14 resulted in the positioning of the gage probes 38 in operational proximity to the secured product.

Following detection of the secured product by the product detector 200, the manufactured rotary metal product is rotated about an axis of rotation by the rotary shaft 18, and a testing cycle carried out. Upon completion of the testing cycle, the gaging probe carrier 30 is displaced to an open configuration, permitting removal of the product and installation of the next product to undergo a testing cycle. No further changes in the two-dimensional positions of the gage probes 38 are required until testing of the next series of products having different dimensions is to begin, at which point each of the improved compound slides 12, 14 is again adjusted as required.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved testing system for an manufactured rotary metal product having upper and lower surfaces, the testing system including a gage frame with a fixed lower portion and a vertically movable upper portion in alignment with the lower portion configured for movement between an open and closed configuration, a shaft for supporting the manufactured rotary metal product rotatably about a fixed axis of rotation within the gage frame, and at least one set of detectors configured to produce signals representative of the presence of predetermined characteristics on the upper and lower surfaces of the manufactured rotary metal product as the manufactured rotary metal product is rotated, the improvement comprising:

a first compound slide configured to support a first detector in said at least one set of detectors, said first compound slide configured for two-dimensional adjustment relative to a lower surface of a manufactured rotary metal product supported on the shaft; and a second compound slide configured to support a second detector in said at least one set of detectors, said second compound slide configured for two-dimensional adjustment relative to an upper surface of the manufactured rotary metal product.

2. The improved testing system of claim 1 wherein said first detector and said second detector in said at least one set of detectors are vertically aligned, and wherein said first compound slide and said second compound slide are in parallel vertical alignment.

3. The improved testing system of claim 1 wherein said first compound slide and said second compound slide have an overlapping range of vertical adjustment.

4. The improved testing system of claim 1 wherein each of said first compound slide and said second compound slide is configured to adjust a position of a detector in said set of detectors radially relative to the fixed axis of rotation of the shaft to accommodate manufactured rotary metal products of differing diameters; and wherein each of said first and second compound slides is configured to adjust a position of a detector in said set of detectors parallel to the fixed axis of rotation of the shaft to accommodate manufactured rotary metal products of differing thickness.

5. The improved testing system of claim 4 wherein each of said first and second compound slides includes a first dove-tail slide configured to horizontally adjust a radial position of a detector in said set of detectors relative to the fixed axis of rotation of the shaft; and wherein each of said first and second compound slides includes a second dove-tail slide configured to vertically adjust a position of a detector in said set of detectors parallel to the fixed axis of rotation of the shaft.

6. The improved testing system of claim 1 wherein said first compound slide is secured to the lower portion of the gage frame;

wherein said second compound slide is secured to the vertically movable upper portion of the gage frame; and wherein the upper portion of the gage frame configured for movement parallel to the axis of rotation of the shaft to permit the loading and unloading of an manufactured rotary metal product on the shaft.

7. The improved testing system of claim 6 wherein said first compound slide is displaced horizontally from the lower portion of the gage frame, such that a portion of said second compound slide is disposed adjacent said first compound slide when the upper portion of the gage frame is in a closed configuration.

8. The improved testing system of claim 7 further including a spacer bracket secured between said first compound slide and said lower portion of the gage frame.

9. The improved testing system of claim 1 wherein said set of detectors includes at least one set of surface dimension detectors for producing signals representative of the presence of predetermined dimensional characteristics of the surface of the manufactured rotary metal product.

10. The improved testing system of claim 1 wherein said set of detectors includes at least one set of surface defect detectors for producing signals representative of the presence of predetermined surface defects on the manufactured rotary metal product.

11. The improved testing system of claim 1 further including a component sensor disposed on said first and second compound slides, said component sensor configured to identify the presence of an manufactured rotary metal product on the shaft.

12. The improved testing system of claim 11 wherein said component sensor includes an optical transceiver disposed on said second compound slide; and an optical reflector disposed on said first compound slide, said optical reflector aligned with said optical transceiver;

wherein the presence of an manufactured rotary metal product on the shaft interrupts a line of sight between said optical transceiver and said optical reflector.

* * * * *